(12) United States Patent
Yoshimoto (10) Patent No.: US 7,768,883 B2
(45) Date of Patent: Aug. 3, 2010

(54) OPTICAL DISK DEVICE AND DATA RECORDING METHOD

(75) Inventor: Tadafumi Yoshimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 482 days.

(21) Appl. No.: 11/927,843

(22) Filed: Oct. 30, 2007

(65) Prior Publication Data

US 2008/0101193 A1    May 1, 2008

(30) Foreign Application Priority Data

Oct. 31, 2006    (JP)    ............... 2006-296045

(51) Int. Cl.
  *G11B 7/00*    (2006.01)
(52) U.S. Cl. ............. 369/44.32; 369/44.25; 369/124.01
(58) Field of Classification Search ............ None
   See application file for complete search history.

(56) References Cited

U.S. PATENT DOCUMENTS 7,522,482 B2 *  4/2009  Tateishi et al. ........... 369/44.11

2002/0196719 A1   12/2002  Morishima
2006/0187773 A1    8/2006  Ishimoto
2008/0089204 A1 *  4/2008  Hoshi et al. ............. 369/93

FOREIGN PATENT DOCUMENTS

| JP | 11-110770 A | 4/1999 |
| JP | 2002-358679 A | 12/2002 |
| JP | 2004-171768 A | 6/2004 |
| JP | 2005-174410 A | 6/2005 |

* cited by examiner

*Primary Examiner*—Muhammad N. Edun
(74) *Attorney, Agent, or Firm*—Global IP Counselors, LLP (57) ABSTRACT

An optical disk device includes an optical pickup, a measurement unit and a control unit. The optical pickup is configured to emit laser light to a disk to record data. The measurement unit is operatively coupled to the optical pickup to measure a peak value of a RF signal outputted from the optical pickup, a fluctuation amplitude of the peak value of the RF signal and an amplitude of the focus drive signal of the optical pickup. The control unit is operatively coupled to the measurement unit to correct the peak value of the RF signal measured during a second recording based on the fluctuation amplitude of the peak value of the RF signal and the amplitude of the focus drive signal measured during a first recording prior to the second recording.

10 Claims, 7 Drawing Sheets

OPTICAL DISK DEVICE AND DATA RECORDING METHOD

CROSS-REFERENCE TO RELATED APPLICATIONS

This application claims priority to Japanese Patent Application No. 2006-296045 filed on Oct. 31, 2006. The entire disclosure of Japanese Patent Application No. 2006-296045 is hereby incorporated herein by reference.

BACKGROUND OF THE INVENTION

1. Field of the Invention

The present invention relates to an optical disk device and a data recording method. More specifically, the present invention relates to an optical disk device and a data recording method for recording data to a disk.

2. Background Information

With an optical disk device that records data to a DVD (Digital Versatile Disk), a CD (Compact Disk) or other such optical disk (hereinafter referred to as a "disk"), an optimal laser power for the disk is determined by taking advantage of a fact that asymmetry in a recorded portion formed on the disk varies with a laser power of an optical pickup that emits laser light to the disk.

However, due to a non-uniformity of reflective film layers of the disk and so forth, it is generally difficult to uniformly maintain sensitivity characteristics of the disk to the laser light. In particular, the sensitivity characteristics of the disk tend to fluctuate in a peripheral direction of the disk.

In view of this, an ROPC (Running Optimum Power Control) is performed to maintain recording quality. In the ROPC, the laser power of the optical pickup is controlled during recording to the disk to deal with a fluctuation in the sensitivity characteristics of the disk and changes in ambient temperature.

Also, an ALPC (Automatic Laser Power Control) is performed to minimize a fluctuation of the laser power due to changes in temperature of a laser light source of the optical pickup. In the ALPC, the laser power during recording is controlled so as to match a specific target value.

Meanwhile, an axial runout slightly occurs in the disk due to deterioration with age or a usage environment after manufacturing, problems during manufacturing and so forth. When the ROPC is performed during recording data to the disk with the axial runout, the axial runout of the disk causes focal deviation to fluctuate periodically. As a result, a fluctuation amplitude appears in a peak value of an RF signal outputted from the optical pickup during recording.

Figure 7:
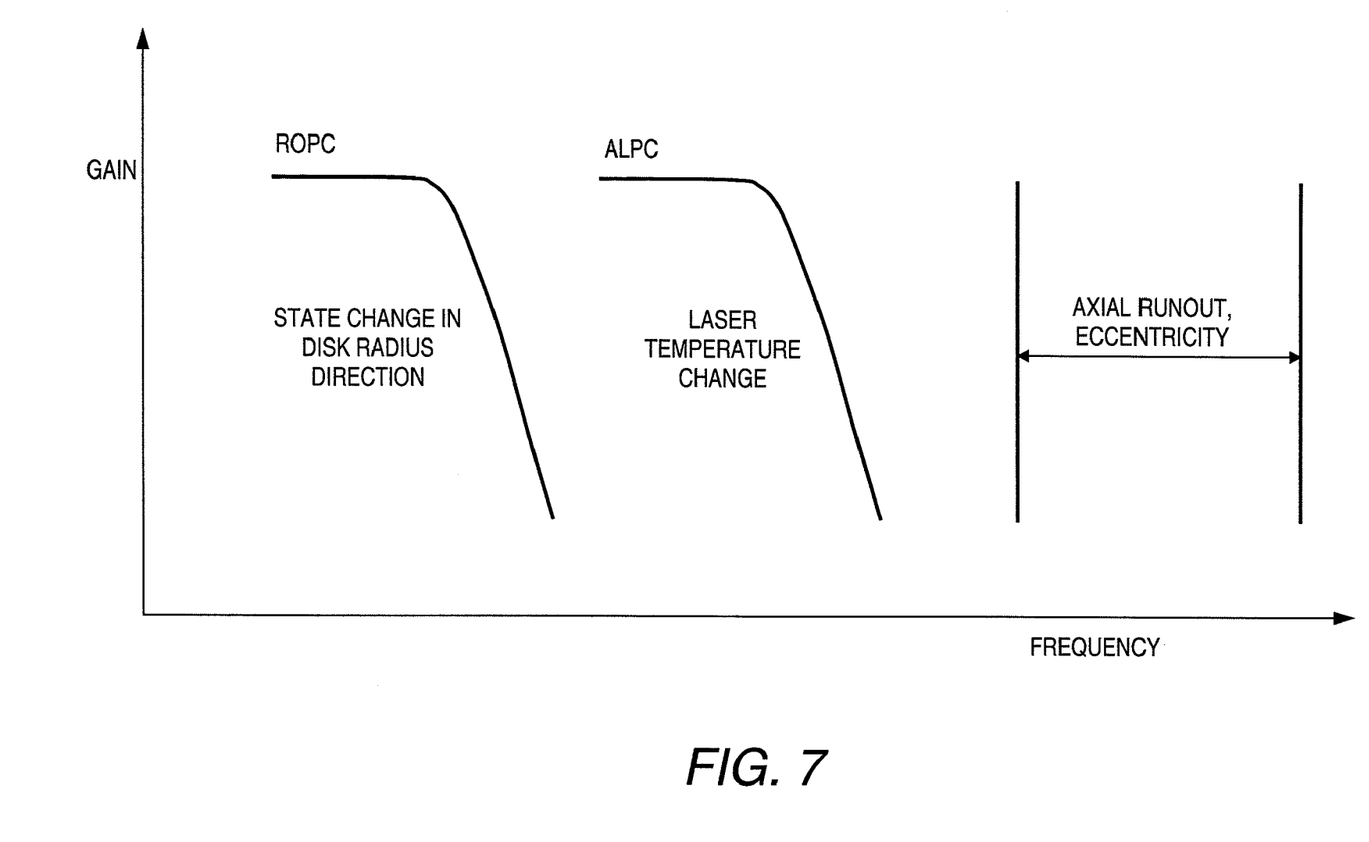
FIG. 7 is a graph of a relation between a response frequency band of a ROPC, a response frequency band of an ALPC and a frequency band of an axial runout.

FIG. 7 is a graph of relationship between the ROPC response frequency band, the ALPC response frequency band and the axial runout frequency band. As can be seen from the graph, the ROPC and the ALPC response frequency bands are different from the axial runout frequency band. Therefore, even if the ROPC and the ALPC are performed, an effect of a state change in disk radius direction or a laser temperature change is eliminated. However, an effect of the axial runout of the disk is difficult to be eliminated. Specifically, it is difficult to distinguish measured fluctuations in the RF signal peak value due to the axial runout and measured fluctuations in the RF signal peak value due to the recording quality.

Therefore, if the ROPC is performed using the peak value of the RF signal having the fluctuation amplitude due to the axial runout, the measured fluctuations in the peak value cause laser power fluctuations during the ROPC. As a result, stable control is prevented.

Also, averaging process is necessary to stabilize the measured fluctuations in the peak value of the RF signal due to the axial runout. However, because the fluctuations due to the axial runout occur in a rotational period of the disk, measurement for at least one rotational period is necessary for the averaging process. Consequently, a large amount of test recording area on an inner periphery of the disk is required.

Various techniques have therefore been proposed for correcting the effect of the axial runout.

With a conventional device, an axial runout is detected by detecting a level of a focus drive signal (see Japanese Laid-Open Patent Application No. 2005-174410, for example). Specifically, a voltage level of the focus drive signal is measured by a voltage measurement circuit. The maximum and minimum values of the voltage level of the focus drive signal are updated, and the maximum amplitude of the focus drive signal is computed by a microcomputer. Then, the computed maximum amplitude is compared to a preset reference value. If the computed maximum amplitude is greater than the reference value, then it is determined that there is an axial runout. Then, a rotation of a spindle motor is controlled, the rotational speed of the disk is controlled, and the maximum reproduction speed is limited. With the conventional device, whether or not there is any axial runout in the disk is merely determined by detecting the level of the focus drive signal. However, the effect of axial runout is not directly eliminated.

With another conventional device, a mechanism for tilt adjustment in a radial direction is driven by a focus drive signal and an offset addition signal, and a mechanism for tilt adjustment in a tangential direction is driven by a differential signal of the focus drive signal (see Japanese Laid-Open Patent Application No. 2002-358679, for example). Specifically, an axial runout of a disk is corrected by driving a tilt adjustment mechanism based on the focus drive signal. However, an effect of axial runout that appears in a peak value of an RF signal is not directly eliminated.

With another conventional device, a drive control of a mechanism for tilt adjustment of an optical pickup is performed so that a detected distance based on a focus drive signal is equal to a reference distance (see Japanese Laid-Open Patent Application No. H11-110770, for example). However, an effect of axial runout that appears in a peak value of an RF signal is not directly eliminated.

With another conventional device, for correcting an axial runout of a disk, another ALPC system that matches the frequency of the axial runout is installed in addition to an original ALPC system (see Japanese Laid-Open Patent Application 2004-171768, for example). However, with this conventional device, a hardware modification (a modification to an internal part of an integrated circuit) is necessary, which increases a manufacturing cost.

In view of the above, it will be apparent to those skilled in the art from this disclosure that there exists a need for an improved optical disk device. This invention addresses this need in the art as well as other needs, which will become apparent to those skilled in the art from this disclosure.

SUMMARY OF THE INVENTION

The present invention was conceived in light of the above-mentioned problems. It is an object of the present invention to provide an optical disk device with which a fluctuation amplitude produced by an axial runout appearing in a peak value of an RF signal during recording is directly eliminated.

In accordance with one aspect of the present invention, an optical disk device includes an optical pickup, a measurement unit and a control unit. The optical pickup is configured to emit laser light to a disk to record data. The measurement unit is operatively coupled to the optical pickup to measure a peak value of a RF signal outputted from the optical pickup, a fluctuation amplitude of the peak value of the RF signal and an amplitude of the focus drive signal of the optical pickup. The control unit is operatively coupled to the measurement unit to correct the peak value of the RF signal measured during a second recording based on the fluctuation amplitude of the peak value of the RF signal and the amplitude of the focus drive signal measured during a first recording prior to the second recording.

With the optical disk device of the present invention, it is possible to provide an optical disk device with which a fluctuation amplitude produced by an axial runout appearing in the peak value of the RF signal during recording is directly eliminated.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
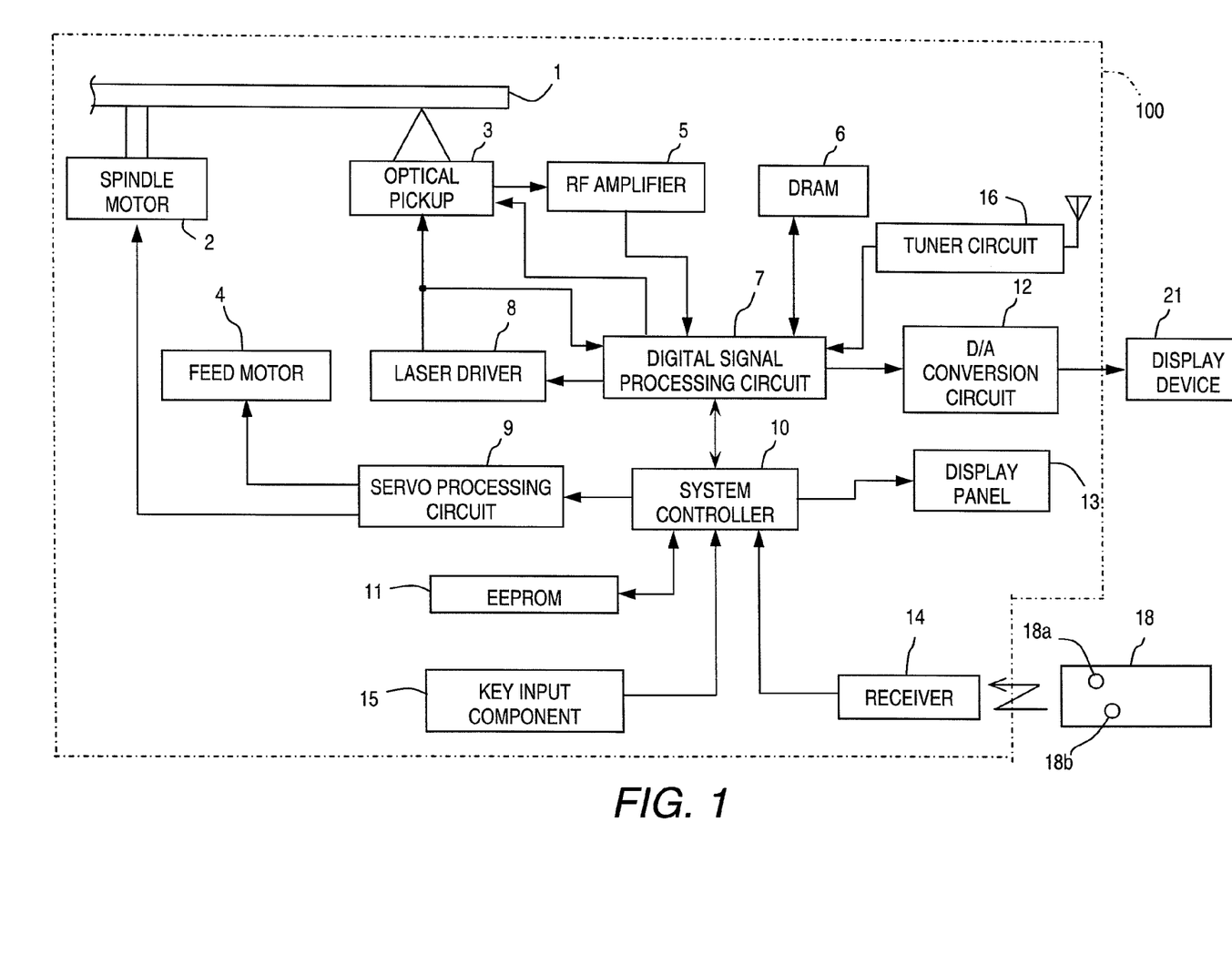
FIG. 1 is a block diagram of an optical disk device in accordance with one embodiment of the present invention.

FIG. 1 illustrates a system configuration when an optical disk device of the present invention is applied to a DVD recorder 100.

The DVD recorder 100 records data to an inserted disk 1. The DVD recorder 100 also reads data from the disk 1 and output the data on a display device 21 such as a CRT, an LCD, a PDP and the like. The DVD recorder 100 includes a spindle motor 2, an optical pickup (e.g., recording means) 3, a feed motor 4, an RF amplifier 5, a DRAM 6, a digital signal processing circuit (e.g., measurement unit or measurement means) 7, a laser driver 8, a servo processing circuit 9, a system controller (e.g., control unit or control means) 10, an EEPROM 11, a D/A conversion circuit 12, a display panel 13, a receiver 14, a key input component 15 and a tuner circuit 16.

The spindle motor 2 rotationally drives the disk 1. The optical pickup 3 writes data to the disk 1 and also reads data from the disk 1. An output of the optical pickup 3 is connected via the RF amplifier 5 to the digital signal processing circuit 7. The feed motor 4 moves the optical pickup 3 in a radial direction of the disk 1. The RF amplifier 5 amplifies a signal outputted from the optical pickup 3 and outputs an RF signal to the digital signal processing circuit 7. An output of the digital signal processing circuit 7 is connected to the laser driver 8. The laser driver 8 controls laser output during the reading and recording of data by the optical pickup 3. An output of the servo processing circuit 9 is connected to the feed motor 4 and the spindle motor 2. The digital signal processing circuit 7 and the servo processing circuit 9 are bidirectionally connected to the system controller 10. The system controller 10 performs operational control over the DVD recorder 100.

The DRAM 6 is bidirectionally connected to the digital signal processing circuit 7. The DRAM 6 serves as a buffer for temporarily storing data during a recording operation or during a reproduction operation. The D/A conversion circuit 12 and the tuner circuit 16 are also connected to the digital signal processing circuit 7. The D/A conversion circuit 12 converts digital data into analog data. Then, the D/A conversion circuit 12 outputs the analog data to the display device 21. The tuner circuit 16 receives television broadcast signals.

The EEPROM 11 is bidirectionally connected to the system controller 10. The EEPROM 11 holds various adjustment values, such as laser power parameters or parameters of the disk 1. The display panel 13, the receiver 14 and the key input component 15 are also connected to the system controller 10. The display panel 13 includes an LCD or the like. The display panel 13 is provided to a front side of a main body of the DVD recorder 100. The receiver 14 receives infrared signals emitted from a remote control 18 by operating one of keys 18a and 18b provided with the remote control 18. The key input component 15 is provided to the front side of the main body of the DVD recorder 100.

The digital signal processing circuit 7 processes data read by the optical pickup 3. Specifically, the digital signal processing circuit 7 divides each 16-bit signal into 8-bit segments and converts the 8-bit segments into 14 bits according to an EFM demodulation or an error correction method, such as an ACIRC (Advanced Cross Interleaved Reed-Solomon Code). Also, the digital signal processing circuit 7 performs an audio expansion processing of modulated audio data and outputs the processed audio data to the D/A conversion circuit 12. The D/A conversion circuit 12 converts the processed audio data into an analog signal, and outputs the signal. The digital signal processing circuit 7 performs data compression of digital television broadcast signal received by the tuner circuit 16 or other such processing for recording data to the disk 1.

Furthermore, the digital signal processing circuit 7 measures a fluctuation amplitude of a peak value (or a peak hold value) of the RF signal during a disk recording (or a second recording) and during a test recording (or a first recording) prior to the disk recording. During rest recording, the DVD recorder 100 performs an adjustment of various adjustment values, such as laser power parameters of the optical pickup 3. The digital signal processing circuit 7 also measures an amplitude of a focus drive signal (hereinafter referred to as an "FD signal") during the disk recording and during the test recording. The FD signal is a signal used to drive the optical pickup 3 up and down in a focus direction in order to focus the laser beam emitted from the optical pickup 3 onto a recording surface of the disk 1.

Figure 2:
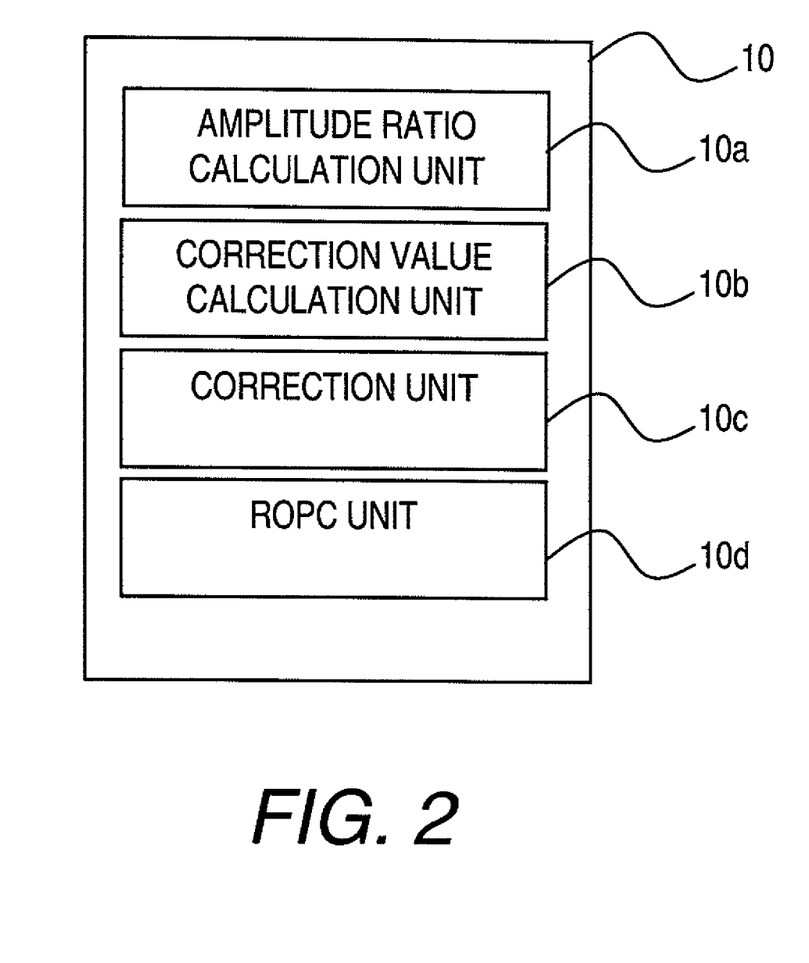
FIG. 2 is a block diagram of a functional configuration of a control unit.

The system controller 10 is made up of a CPU, ROM, RAM, etc. As shown in FIG. 2, the system controller 10 includes an amplitude ratio calculation unit 10*a*, a correction value calculation unit 10*b*, a correction unit 10*c* and an ROPC unit 10*d*. The system controller 10 acquires the fluctuation amplitude of the peak value of the RF signal and the amplitude of the FD signal from the digital signal processing circuit 7 during the test recording prior to the disk recording. The amplitude ratio calculation unit 10*a* calculates an amplitude ratio of the fluctuation amplitude of the peak value of the RF signal and the amplitude of the FD signal. Then, the amplitude ratio calculation unit 10*a* stores the amplitude ratio in a specific region of the EEPROM 11. The system controller 10 also acquires the fluctuation amplitude of the peak value of the RF signal and the amplitude of the FD signal from the digital signal processing circuit 7 during the disk recording. The correction value calculation unit 10*b* calculates a correction value based on the measured amplitude of the FD signal during the disk recording and the amplitude ratio stored in the EEPROM 11. The correction unit 10*c* uses the correction value to correct the measured peak value of the RF signal. The ROPC unit 10*d* uses the corrected RF signal to perform the ROPC.

Referring to FIGS. 3-6, a correction processing of the RF signal will now be described. FIGS. 3A and 3B are diagrams illustrating a waveform of the RF signal and a waveform of the FD signal. When the disk 1 has the axial runout, a fluctuation synchronized with the axial runout is generated in the FD signal as shown in FIG. 3B. Meanwhile, when the disk 1 has the axial runout, a fluctuation synchronized with the axial runout is also generated in the peak value of the RF signal. With the system controller 10, the fluctuation due to the axial runout appearing in the peak value of the RF signal is eliminated with the fluctuation due to the axial runout appearing in the FD signal. This allows stable peak value of the RF signal.

(1) Processing Operation During Test Recording

Figure 3A:
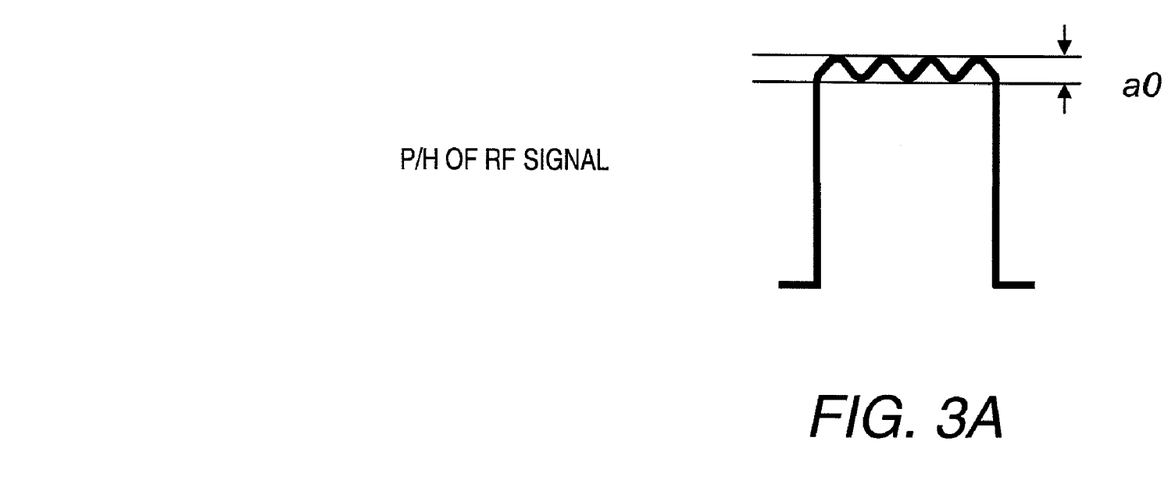
FIG. 3A is a diagram of a waveform of an RF signal during test recording prior to disk recording.
Figure 3B:
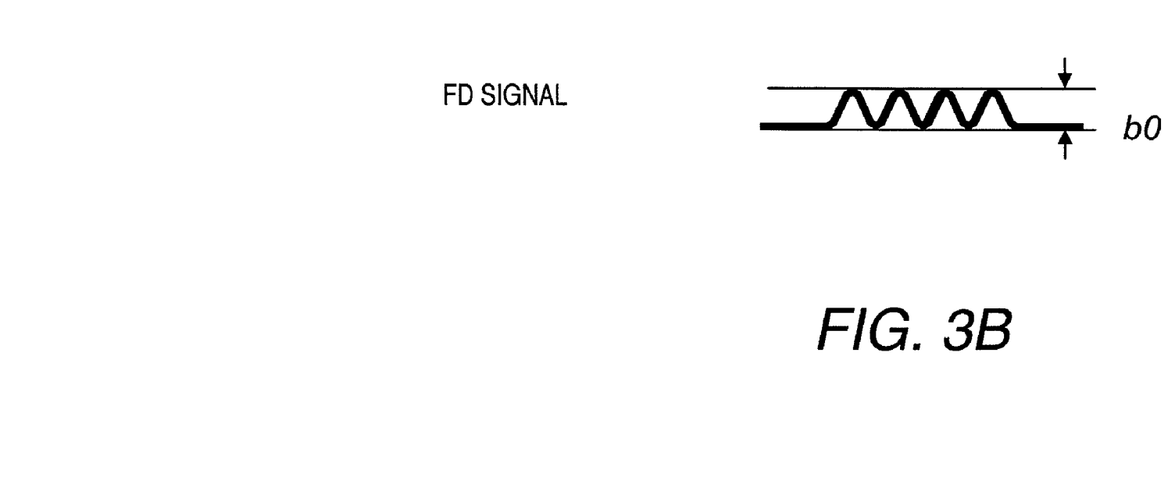
FIG. 3B is a diagram of a waveform of an FD signal during the test recording prior to the disk recording.
Figure 5:
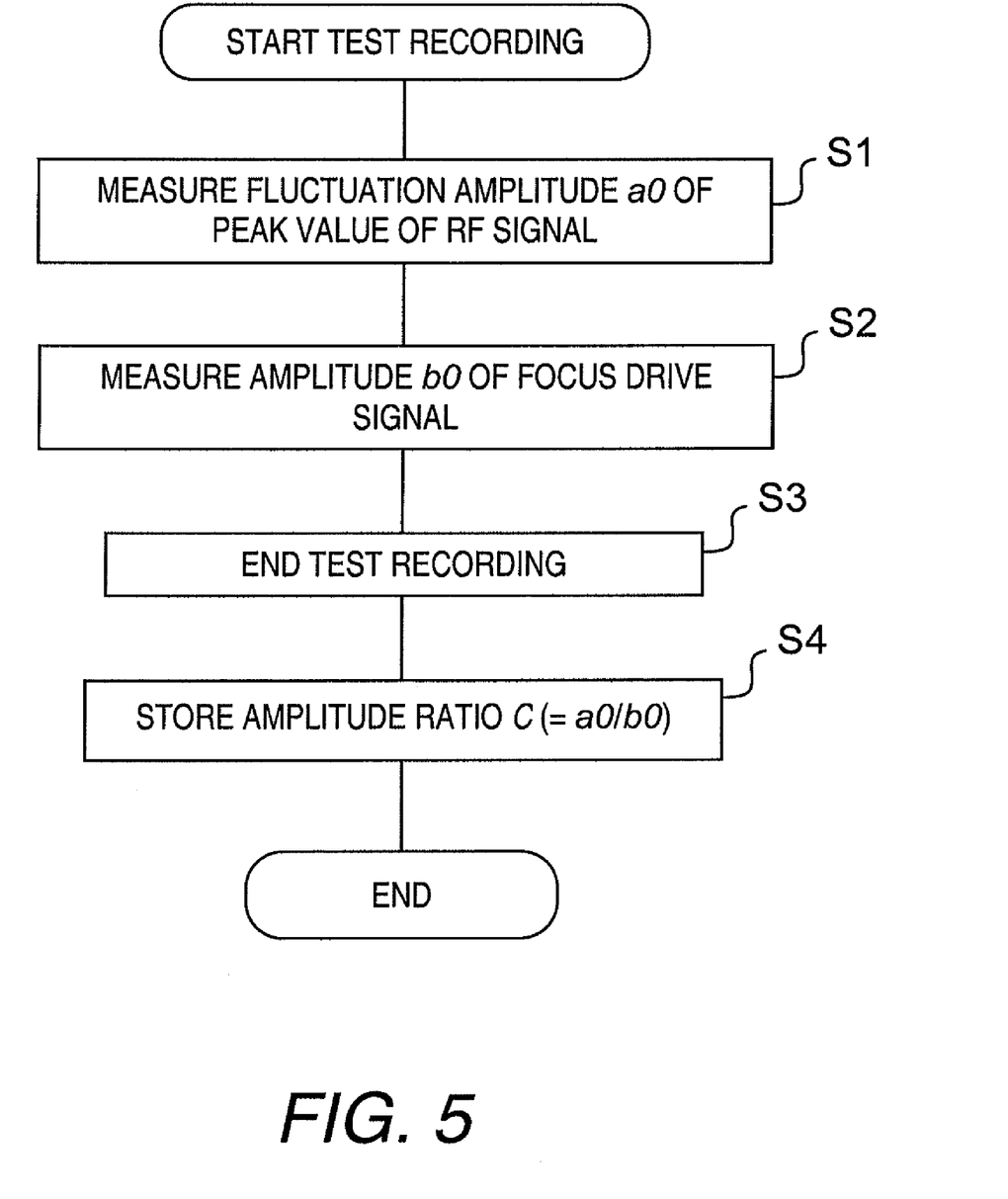
FIG. 5 is a flowchart of a processing operation during the test recording prior to the disk recording.

As shown in FIGS. 3 and 5, the system controller 10 measures the fluctuation amplitude a0 of the peak value of the RF signal and the amplitude b0 of the FD signal with the digital signal processing circuit 7 during the test recording prior to the disk recording (steps S1 and S2). When test recording is complete (step S3), the amplitude ratio calculation unit 10*a* of the system controller 10 calculates the amplitude ratio c(=a0/b0) of the measured amplitudes. The amplitude ratio c is a ratio of the fluctuation amplitude a0 of the peak value of the RF signal and the amplitude b0 of the FD signal. Then, the amplitude ratio calculation unit 10*a* stores the amplitude ratio c in the specific region of the EEPROM 11 (step S4).

(2) Processing Operation During Disk Recording

Figure 4A:
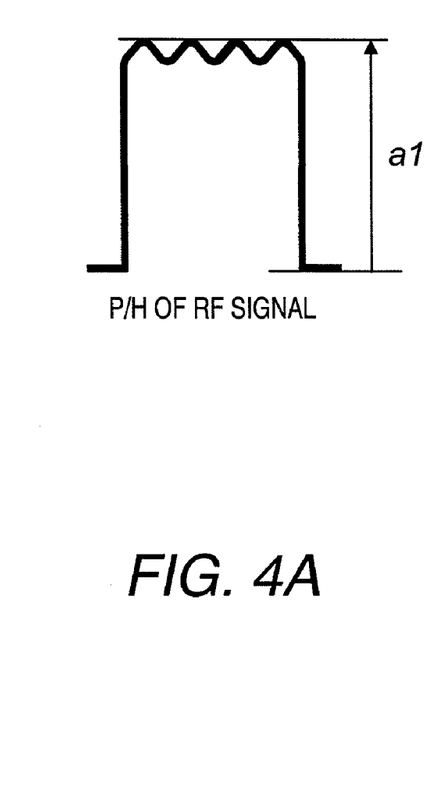
FIG. 4A is a diagram of a waveform of an RF signal during the disk recording.
Figure 4B:
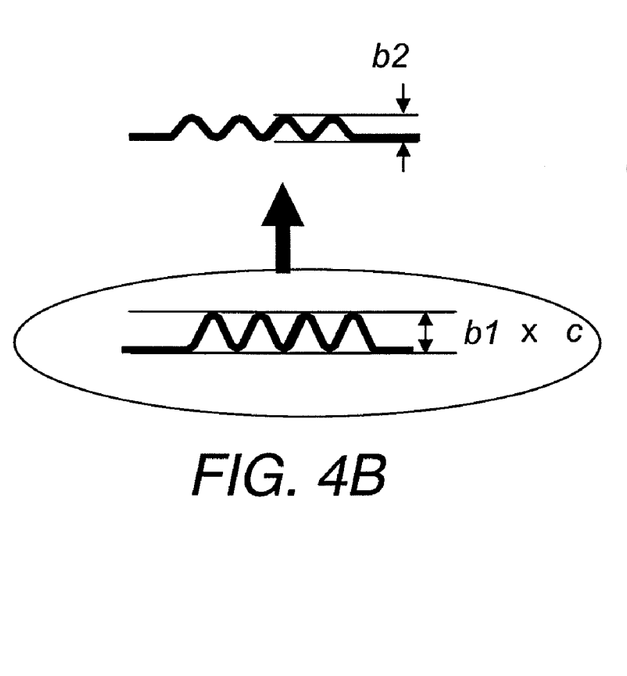
FIG. 4B is a diagram of waveforms of an FD signal and a corrected FD signal during the disk recording.
Figure 4C:
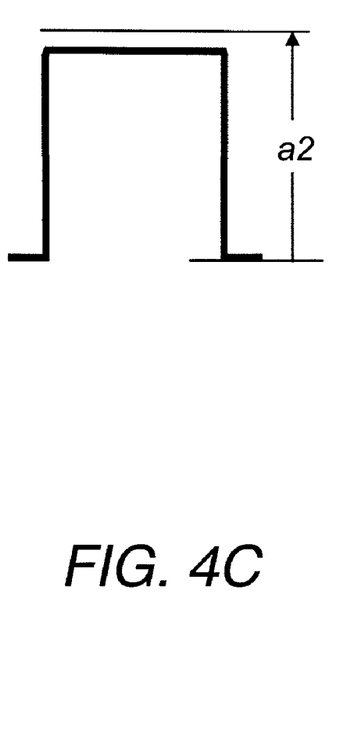
FIG. 4C is a diagram of a waveform of a corrected RF signal during the disk recording.
Figure 6:
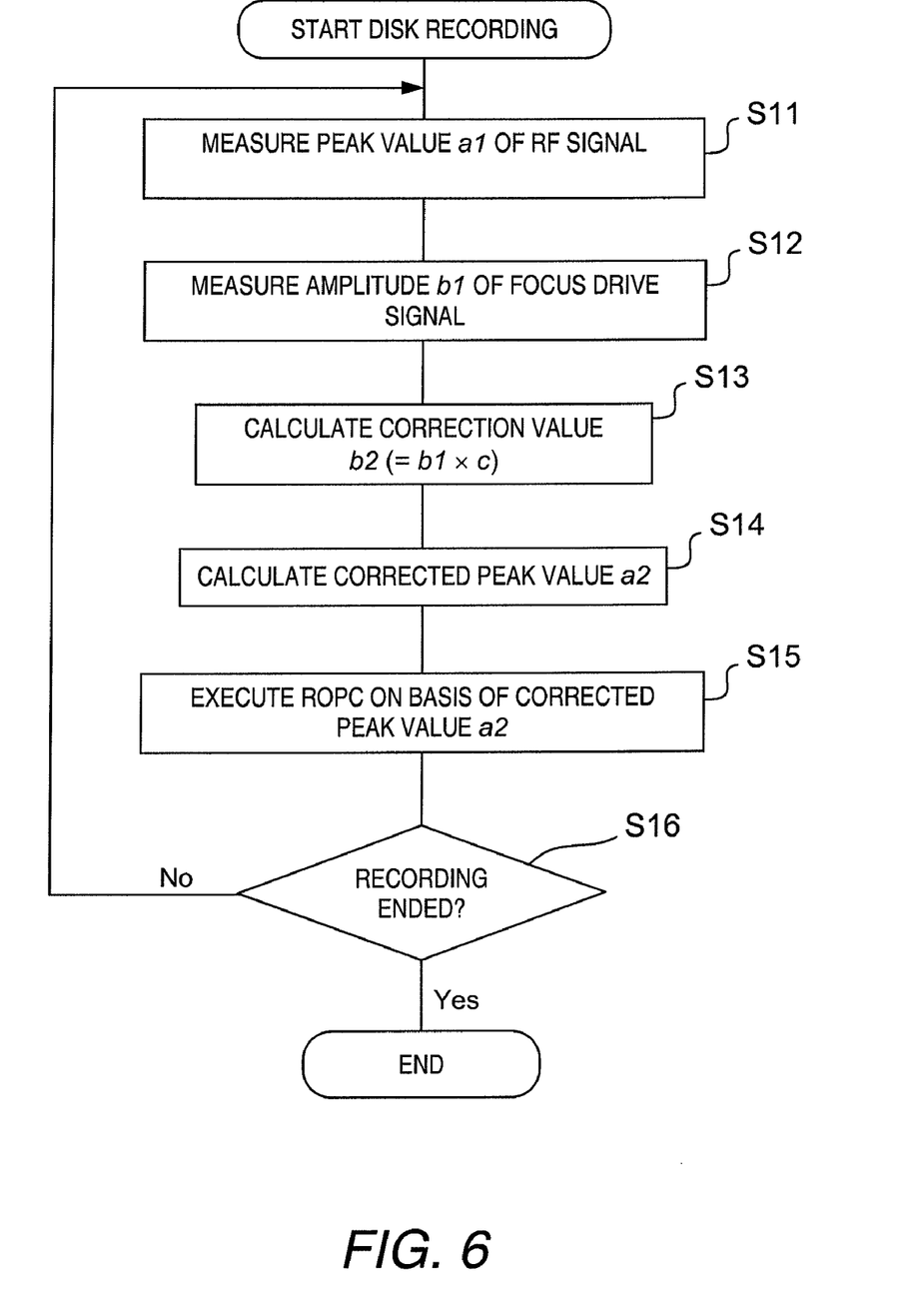
FIG. 6 is a flowchart of a processing operation during the disk recording.

As shown in FIGS. 4 and 6, once recording to the disk 1 has commenced, the system controller 10 measures a peak value a1 of the RF signal and the amplitude b1 of the FD signal with the digital signal processing circuit 7 (steps S11 and S12). The correction value calculation unit 10*b* of the system controller 10 calculates a correction value b2(=b1×c) by multiplying the amplitude b1 of the FD signal by the amplitude ratio c stored in the EEPROM 11 (step S13). Then, the correction unit 10*c* calculates a peak value a2 of a corrected RF signal based on the measured peak value a1 of the RF signal and the correction value b2. Thus, the fluctuation amplitude of the peak value a1 is eliminated with the correction value b2. Specifically, the correction unit 10*c* calculates the peak value a2 of the corrected RF signal by subtracting the correction value b2 from the measured peak value a1 of the RF signal (a1−a2) or by adding the correction value b2 to the measured peak value a1 of the RF signal (a1+b2) (step S14). As a result, the peak value a2 of the RF signal is measured stably. The ROPC unit 10*d* of the system controller 10 performs the ROPC using the peak value a2 of the corrected RF signal (step S15). The system controller 10 performs the correction of the peak value of the RF signal with the FD signal (steps S11 to S15) continuously until the disk recording is complete (until the answer is yes in step S16). This makes it possible to perform a stable ROPC that is not affected by the axial runout of the disk 1.

With the DVD recorder 100, a waveform of the FD signal is removed from a waveform of the peak value of the RF signal during the disk recording. Therefore, suppressing fluctuation in recording laser power due to axial runout of the disk 1 during the disk recording. In other words, the fluctuation amplitude in the peak value a1 of the RF signal produced by the axial runout of the disk 1 is eliminated. Therefore, the peak value a2 of the corrected RF signal is stably measured even if there is the axial runout of the disk 1, which results in the stable ROPC without being affected by the axial runout of the disk. Furthermore, this in turn makes possible a stable recording to the disk 1. Moreover, the DVD recorder 100 deals with the axial runout of the disk 1 without any hardware modifications. Therefore, the DVD recorder 100 performs the stable recording to the disk 1 without increasing a manufacturing cost.

The present invention can be applied not only to the ROPC, but also to any control operation in which it is necessary to measure the peak value a2 of the corrected RF signal during the disk recording.

Furthermore, the amplitude ratio c can be calculated during a first disk recording other than the test recording. Then, the amplitude ratio c can be used as described above during a second disk recording subsequent to the first disk recording.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. An optical disk device comprising:
 an optical pickup configured to emit laser light to a disk to record data;
 a measurement unit operatively coupled to the optical pickup to measure a peak value of a RF signal outputted from the optical pickup, a fluctuation amplitude of the peak value of the RF signal and an amplitude of a focus drive signal of the optical pickup; and
 a control unit operatively coupled to the measurement unit to correct the peak value of the RF signal measured during a second recording based on the fluctuation amplitude of the peak value of the RF signal and the amplitude of the focus drive signal measured during a first recording prior to the second recording.

2. The optical disk device according to claim 1, wherein the control unit includes
 an amplitude ratio calculation unit configured to calculate an amplitude ratio of the fluctuation amplitude of the peak value of the RF signal and the amplitude of the focus drive signal measured during the first recording,
 a correction value calculation unit configured to calculate a correction value based on the amplitude of the focus drive signal measured during the second recording and the amplitude ratio calculated by the amplitude ratio calculation unit, and
 a correction unit configured to correct the peak value of the RF signal measured during the second recording based on the correction value.

3. The optical disk device according to claim 2, wherein the correction value calculation unit is configured to calculate the correction value by multiplying the amplitude of the focus drive signal measured during the second recording by the amplitude ratio calculated by the amplitude ratio calculation unit.

4. The optical disk device according to claim 2, wherein the correction unit is configured to correct the peak value of the RF signal measured during the second recording so that a fluctuation amplitude of the peak value of the RF signal measured during the second recording is eliminated with the focus drive signal measured during the second recording.

5. The optical disk device according to claim 4, wherein the correction unit is configured to correct the peak value of the RF signal measured during the second recording by subtracting the correction value from the peak value of the RF signal measured during the second recording or by adding the correction value to the peak value of the RF signal measured during the second recording.

6. The optical disk device according to claim 2, wherein the control unit further includes an ROPC unit configured to perform a Running Optimum Power Control based on the peak value of the RF signal corrected by the correction unit.

7. The optical disk device according to claim 1, wherein the control unit is further configured to perform the first recording as a test recording prior to performing a disk recording for recording the data to the disk.

8. An optical disk device comprising:
 an optical pickup configured to emit laser light to a disk to record data;
 a control unit operatively coupled to the optical pickup and configured to eliminate a waveform of a focus drive signal of the optical pickup from a waveform of a peak value of an RF signal outputted from the optical pickup during a recording so that a fluctuation in laser power of the optical pickup due to an axial runout of the disk is suppressed during the recording.

9. An optical disk device comprising:
 an recording means for emitting laser light to a disk to record data;
 a measurement means for measuring a peak value of a RF signal outputted from the recording means, a fluctuation amplitude of the peak value of the RF signal and an amplitude of a focus drive signal of the recording means; and
 a control means for correcting the peak value of the RF signal measured during a second recording based on the fluctuation amplitude of the peak value of the RF signal and the amplitude of the focus drive signal measured during a first recording prior to the second recording.

10. A data recording method for an optical disk device having an optical pickup comprising:
 measuring a fluctuation amplitude of a peak value of an RF signal outputted from the optical pickup during a first recording;
 measuring an amplitude of a focus drive signal of the optical pickup during the first recording;
 measuring the peak value of the RF signal during a second recording subsequent to the first recording; and
 correcting the peak value of the RF signal measured during the second recording based on the fluctuation amplitude of the peak value of the RF signal and the amplitude of the focus drive signal measured during the first recording.

* * * * *